United States Patent [19]
Parry

[11] 3,715,754
[45] Feb. 6, 1973

[54] TETHERED CHAFF STRAND COUNTERMEASURE WITH TRAILING END KITE

[75] Inventor: John F. W. Parry, Loma Linda, Calif.

[73] Assignee: The United States of America as represented by the Secretary of the Air Force

[22] Filed: Sept. 15, 1967

[21] Appl. No.: 670,013

[52] U.S. Cl..............................343/18 B, 343/18 E
[51] Int. Cl..........................H01q 15/14, H04k 3/00
[58] Field of Search.........................343/18 B, 18 E

[56] References Cited

UNITED STATES PATENTS

| | | | |
|---|---|---|---|
| 2,470,783 | 5/1949 | Mead | 343/18 B |
| 2,570,549 | 10/1951 | Hansell | 343/18 B |
| 3,229,290 | 1/1966 | Fisher | 343/18 B |

Primary Examiner—T. H. Tubbesing
Attorney—Harry A. Herbert, Jr. and Henry P. Wilder

[57] ABSTRACT

A tethered chaff strand countermeasure system having a trailing end kite to pull the chaff strand out of the line of trajectory of the front end object so as to form a reflecting helix.

6 Claims, 4 Drawing Figures

PATENTED FEB 6 1973
3,715,754
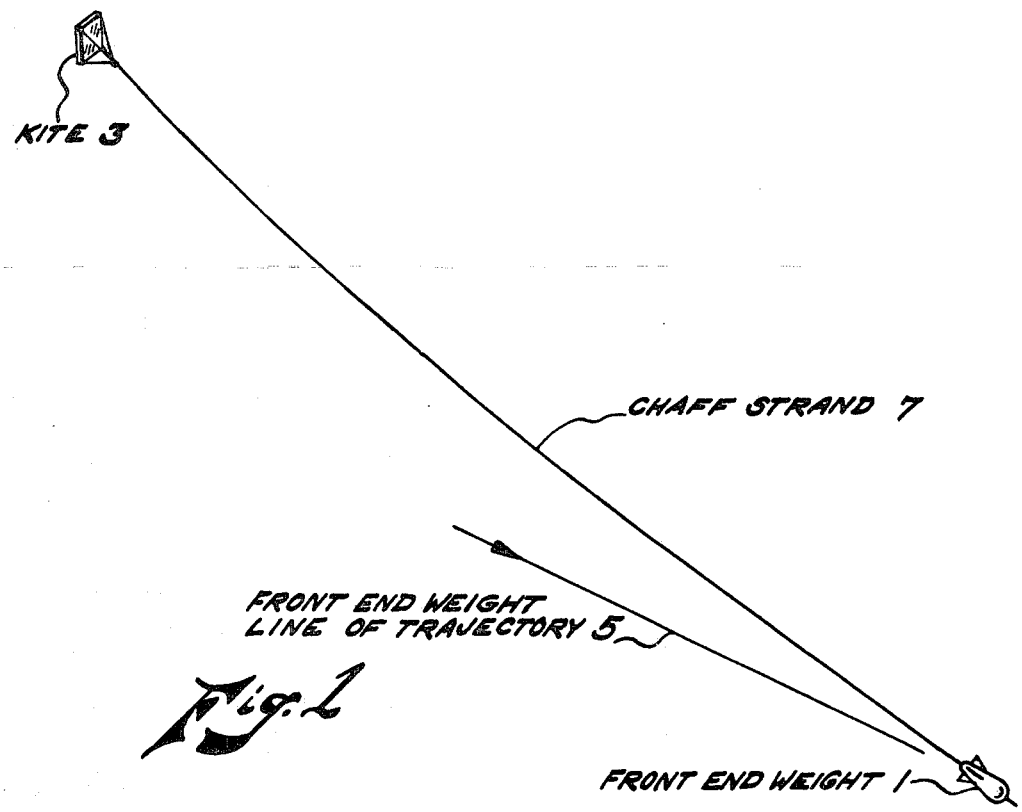
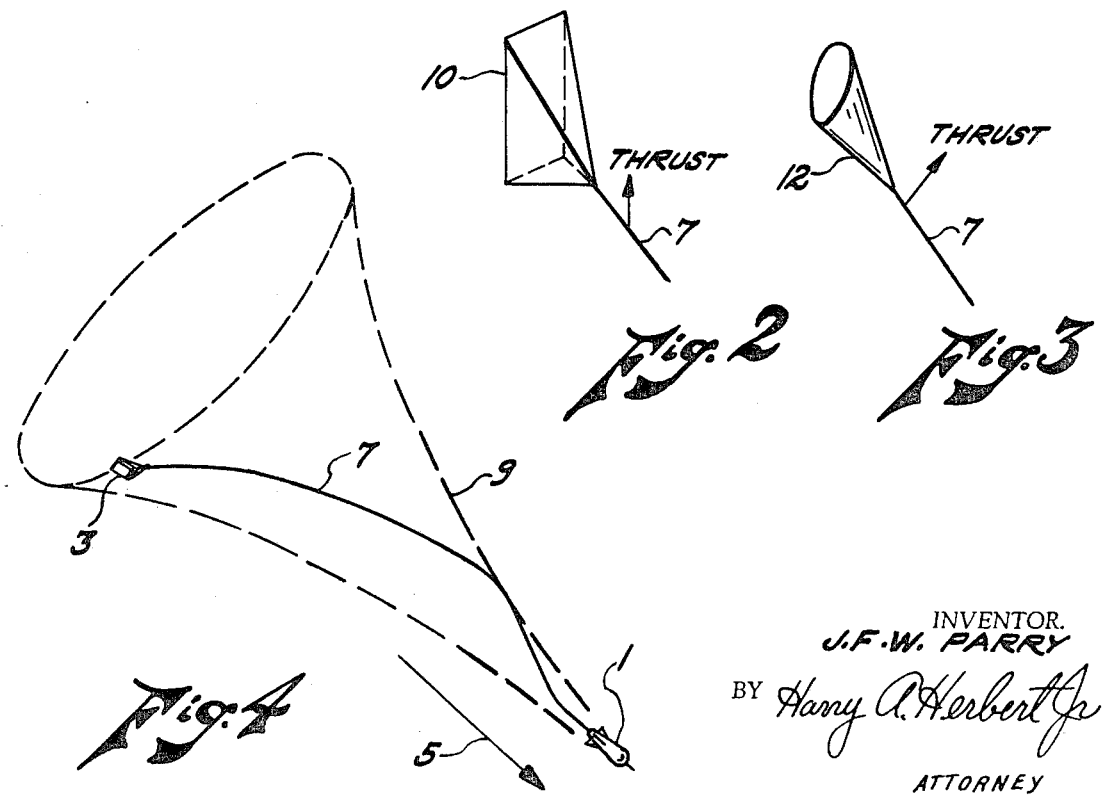
INVENTOR.
J.F.W. PARRY
BY Harry A. Herbert Jr
ATTORNEY

TETHERED CHAFF STRAND COUNTERMEASURE WITH TRAILING END KITE

BACKGROUND OF THE INVENTION

The invention pertains generally to reflected or returned wave radar systems and in particular to an airborne radar countermeasure device which is released by an aircraft or missile in an attempt to screen the aircraft from radar observation. The released countermeasure device will reflect radar signals to a greater or different degree than the screened, releasing aircraft or missile and will cause automatic follow-up ground and aerial artillery to attack the released countermeasure device, in an effort to destroy it, rather than the releasing, screened aircraft or missile.

Prior art airborne countermeasure systems have used various chaff techniques in attempts to screen aircraft from radar observation. One such technique comprises a chaff bundle which is a package containing a group of similar or various sized metallic foil strips used for creating radar echos for confusion purposes. However, these chaff strips quickly lose their ability to screen the aircraft primarily because of a rapid slow down of the chaff strip and therefore a velocity mismatch (Doppler discrimination) between the screened aircraft and the released chaff strips. Another prior art chaff type countermeasure is the tethered chaff strand wherein a small filament or strand of a flexible metallic or metalized material and have a length of several wavelengths at the radar frequencies to be reflected is attached to a simple weight. The weight preferably has a streamlined shape to reduce its air resistance. A large number of tethered chaff strands are assembled into a package or rope which is released from the screened aircraft or missile, similar to the deployment of chaff bundles. Because of the weight, the chaff strands continue to move at a speed approximating that of the releasing vehicle for an appreciable time, especially at very high altitudes. The chaff strand plus the simple front end weight have a much higher coefficient of reflection than the chaff strand alone and thereby the combination attains a much better physical match with the screened object. Also, because of the weight of the decoy, there is a much better velocity match between the tethered chaff strand device and the screened aircraft, and thus the tethered chaff strand and the aircraft remain in a single radar resolution cell for a longer time period. The tethered chaff strand tends to trail directly behind the towing, decoy device, however, and thus lies in a straight line along the decoy's line of trajectory. This provides a poor, or possibly no reflective return to terminally (target) located radars. Also, the chaff strand will cause a number of null returns at other radar sites because such nulls are a characteristic of the radar reflection pattern of a long straight wire. The present invention overcomes these disadvantages by providing a three-dimensional reflective surface.

BRIEF SUMMARY OF THE INVENTION

In the chaff type countermeasure system of the present invention, a trailing end object, hereinafter referred to as a kite, is attached to the remote end of the tethered chaff strand. The kite is designed to pull the chaff strand out of the line of trajectory of the towing, decoy and to cause the chaff strand to rotate about this trajectory line.

BRIEF DESCRIPTION OF THE DRAWINGS

FIG. 1 is a view illustrating the line of trajectory of the towing, front-end object with respect to the trajectory of the kite.

FIG. 2 is a view illustrating a kite which has a pyramid shape.

FIG. 3 is a view illustrating a kite which has the shape of an oblique cone.

FIG. 4 is a view illustrating the motion of the kite as it rotates to generate the configuration of a tapered helix.

DESCRIPTION OF THE PREFERRED EMBODIMENT

Referring now to FIG. 1, the manner of operation of the invention is illustrated by the relative directions of the lines of trajectory of the towing, front-end weight 1 (shown here as bomb-shaped) and the trailing kite 3. The kite 3 is designed to produce a lifting force which will pull the chaff strand 7 out of line of trajectory 5 of the towing weight 1. This will allow the chaff strand 7 to produce a high radar return in the forward direction and thus be observed by radars which are located over a considerable area centered on the target point. Furthermore, the kite geometry is chosen so that the chaff strand is made to rotate about the decoy's line of trajectory. Through the proper choice of the kite design, the chaff strand can be made to rotate about the trajectory line 5 and generate a configuration which approximates a tapered helix. This tapered helical configuration will exhibit the characteristics of a broadband helical antenna and will give good radar returns irrespective of radar operating frequency over a wide bandwidth. Other advantages to this kite ended tethered chaff strand countermeasure are omnidirectional antenna characteristics, no or very few nulls in the radar return pattern, and a high radar coefficient of reflection, thus giving a much better velocity and physical match with the screened aircraft.

The kite 3 may have any one of several geometries which will cause the chaff strand 7 to be pulled out of the towing decoy's line of trajectory 5, and to be rotated about that line. One possible design is a simple flat plate 3 which is towed at such an attitude as to produce the desired lift and rotation. Two other possible kite designs are illustrated in FIG. 2 and FIG. 3. FIG. 2 illustrates a kite having the shape of a pyramid 10, and FIG. 3 illustrates a kite having the shape of an oblique cone 12. In general, any aerofoil shaped object can be used in which the required center of pressure and angulation can be achieved.

FIG. 4 illustrates the motion of the chaff strand 7 as it rotates about the trajectory line 5 of the towing weight 1 to generate the tapered helical configuration 9. The particular tapered helix which is generated will depend upon such factors as the weight of the kite and the length of the chaff strand.

It is obvious that various modifications may be made that fall within the scope of the invention. Therefore, the inventor intends to be limited only to the broad interpretation of the appended claims.

I claim:

1. A countermeasure system comprising:
    a tethered chaff strand attached to a front-end weight having a free trajectory;

trailing-end object means attached to the end of said chaff strand remote from the front-end weight for producing aeroddynamic lift to pull the chaff strand out of the line of trajectory of said front-end weight.

2. A countermeasure system according to claim 1 wherein said trailing end object means also rotates about the line of trajectory of the front-end weight.

3. A countermeasure system according to claim 2 wherein the rotations of the chaff strand approximate a tapered helix.

4. A countermeasure system according to claim 3 wherein the trailing end object has the shape of a flat plate.

5. A countermeasure system according to claim 3 wherein the trailing end object has the shape of a pyramid.

6. A countermeasure system according to claim 3 wherein the trailing end object has the shape of an oblique cone.

* * * * *